US005903255A

United States Patent [19]

Busch et al.

[11] Patent Number: 5,903,255

[45] Date of Patent: May 11, 1999

[54] METHOD AND SYSTEM FOR SELECTING A COLOR VALUE USING A HEXAGONAL HONEYCOMB

[75] Inventors: Brendan G. Busch, Woodside; Rosanna H. Ho, Foster City; Marc R. Keller, Sunnyvale; Hannes Ruescher, Palo Alto; Eric P. Wilfrid, Mountain View; Cathleen G. Harris, Los Altos, all of Calif.

[73] Assignee: Microsoft Corporation, Redmond, Wash.

[21] Appl. No.: 08/593,514

[22] Filed: Jan. 30, 1996

[51] Int. Cl.[6] ........ G09G 5/04

[52] U.S. Cl. ........ 345/150; 345/146; 345/352; 345/431

[58] Field of Search ........ 345/431, 150, 345/153, 199, 146, 156, 186, 352–354, 152

[56] References Cited

U.S. PATENT DOCUMENTS

| | | | |
|---|---|---|---|
| 4,454,593 | 6/1984 | Fleming et al. | 345/150 |
| 4,721,951 | 1/1988 | Holler | 345/154 |
| 4,843,599 | 6/1989 | Bucker | 345/150 |
| 5,465,104 | 11/1995 | Mursor | 345/150 |
| 5,473,738 | 12/1995 | Hamlin et al. | 395/131 |
| 5,552,805 | 9/1996 | Alpher | 345/153 |

OTHER PUBLICATIONS

Custom Color Selector Screen in Program Manager, Microsoft Windows for Workgroups, Version 3.11, Microsoft Corporation, 1993.

Foley, James D. et al., *Computer Graphics, Principles and Practice*, Second Edition, Plates II.3–II.5, Addison–Wesley Publishing Company, Reading, Mass., 1990.

Inside Macintosh vol. V, Apple Computer Inc., Color Picker Dialog Box Diagram, Sample Dialog with Color Dialog Items Diagram and pp. V–171–V–177, Addison–Wesley Publishing Company, Reading, Mass., 1988.

*Primary Examiner*—Lun-Yi Lao
*Attorney, Agent, or Firm*—Seed & Berry LLP

[57] ABSTRACT

A method and system for selecting a color for display in a computer system. The present invention provides a color picker that displays the available colors in a honeycomb with an overall shape of a hexagon ("hexagonal honeycomb"). The color picker fills each cell of the honeycomb with a distinct color. The color picker fills each cell at a corner of the hexagonal honeycomb with certain colors and the center cell of the hexagonal honeycomb with a gray scale color. The other cells are filled with colors that are based approximately on their distance from the corner cells. The color picker also displays a second honeycomb that contains gray scale colors. A user then uses a mouse to select a cell of either honeycomb that contains the desired color.

22 Claims, 14 Drawing Sheets

METHOD AND SYSTEM FOR SELECTING A COLOR VALUE USING A HEXAGONAL HONEYCOMB

TECHNICAL FIELD

The present invention relates generally to a method and system for selecting a color value, and in particular, selecting a color value from a hexagonal honeycomb filled with a color in each cell.

BACKGROUND OF THE INVENTION

Computer systems typically allow a user to select in which color a certain characteristic is to be displayed. For example, a word processing computer program may allow a user to select the background color for text, to select the color for each character of the text, and to select a color in which highlighted information is to be displayed. Because typical computer programs allow a user to specify over 16 million ($2^{24}$) different colors, it is not practicable to display each of the colors and allow the user to select a color. Some computer programs allow the user to simply specify which of the possible colors by entering a unique numeric value associated with the color. For example, a user may enter a number between 1 and 16 million as the unique identification of a color. Since colors are typically represented by their red, green, and blue components (RGB values), a more intuitive approach to specifying a color is to specify the mixture of these components. (In addition to the RGB color models, other color models may be used, such as cyan, magenta, and yellow (CMY); luminance and chromacity (YIQ); and hue, saturation, and value (HSV).) Typically, each of these components can have 256 different levels of intensities (i.e., $256^3$=16 million possible colors). Thus, to specify the color yellow a user may specify a red component of 128, a green component of 128, and a blue component of 0. However, a user who specifies a color by entering the RGB values typically cannot accurately visualize what a particular color will look like when it is displayed.

To overcome this visualization problem, some computer programs select a subset of the 16 million different colors and display that subset on a computer screen. The user can select one of the colors from that subset. Even though the selection of colors is limited, users generally prefer this approach of color selection. A couple of different approaches are typically used for displaying the various colors to a user: a color square and a color circle. In a color square, the available colors are displayed in a rectangle. The colors vary horizontally from red, to yellow, to green, to cyan, to blue, to magenta, and then back to red, and each of the colors vary vertically from dark at the top to lighter at the bottom. A user uses a mouse pointer to select any specific color on the color square. The color square has a disadvantage, however, in that the colors tend to blend into one another and the user cannot easily visualize or pick a discrete color. In a color circle the colors are arranged from red, to yellow, to green, to cyan, to blue, to magenta, and then back to red around the perimeter of the color circle, and the colors get lighter towards the center of the color circle. The color circle has similar disadvantages to the color square.

It would be desirable to have a technique for displaying colors in a way that is visually appealing to a user, that allows for various combinations of color components, and that allows the user to see the distinct color that is being selected.

SUMMARY OF THE INVENTION

The present invention provides a method and system for selecting a color. In a preferred embodiment, the system displays a plurality of colors on a display device. Each color is displayed in a cell of a honeycomb. A cell is in the shape of a hexagon, and the cells fill the area of the honeycomb. The system then receives a selection of one of the cells of the honeycomb and indicates that the color displayed in the selected cell is the selected color. In a preferred embodiment, the honeycomb has an overall shape that is hexagonal. The hexagonal honeycomb has six corners with a cell at each corner. The system fills the cells at each corner each with a different color and fills cells other than the corner cells of the honeycomb each with a color that is a mixture of colors that is based on proximity of the cell to the six corners. In a preferred embodiment, the system displays a second honeycomb that contains gray scale colors.

The system preferably receives the selection of a cell as X, Y coordinates and determines to which cell of the honeycomb X, Y coordinates correspond. To make this determination, the system logically divides the honeycomb into rows and columns forming rectangles. Each row extends from the top of a cell to the top of a next lower cell. Each column extends from a left side of a cell to a vertical axis of a cell or from a vertical axis of a cell to a right side of a cell. A rectangle may contain a portion of two cells. The system then identifies to which rectangle the X, Y coordinates correspond and identifies the cells within the identified rectangle to which the X, Y coordinates correspond as the determined cell.

The file of this patent contains at least one drawing executed in color. Copies of this patent with the color drawings will be provided by the Patent and Trademark Office upon request and payment of the necessary fee.

DETAILED DESCRIPTION OF THE INVENTION

Figure 1:
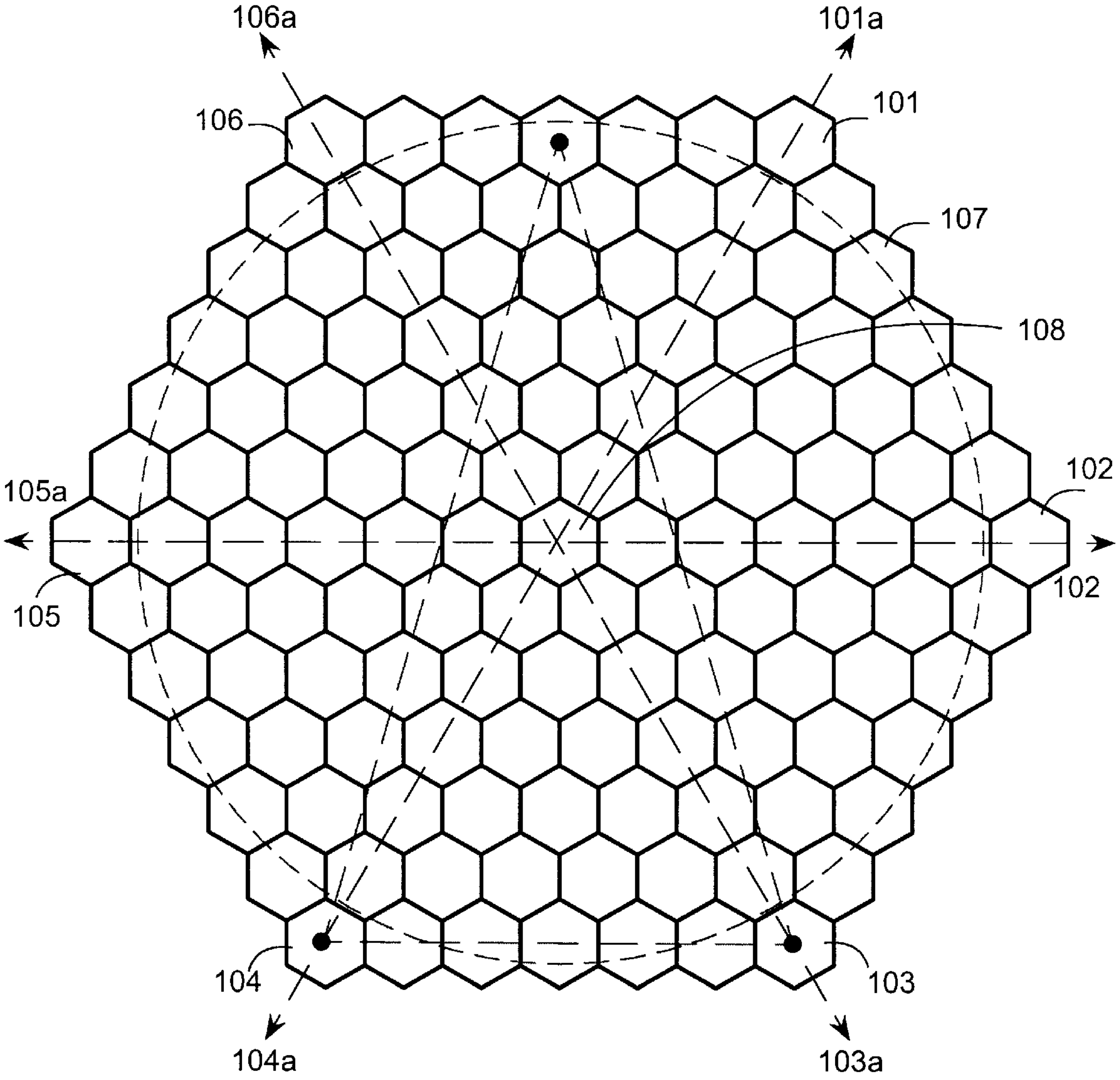
FIG. 1 illustrates a hexagonal honeycomb.

The present invention provides a method and a system for selecting a color from a display of possible color values. In a preferred embodiment, the system displays the colors that can be selected in the pattern of a hexagonal honeycomb. A honeycomb is an area that is filled with cells that are in the shape of a hexagon. A hexagonal honeycomb is a honeycomb whose overall shape is a hexagon. FIG. 1 illustrates a hexagonal honeycomb. The hexagonal honeycomb has six corners 101–106 and six axes 101*a*–106*a*. The hexagonal honeycomb is filled with cells 107. When the system displays the hexagonal honeycomb, it fills each cell with a color. A user then selects a color by using a pointing device (e.g., a mouse) to point to the cell that is filled with the desired color.

Figure 2A:
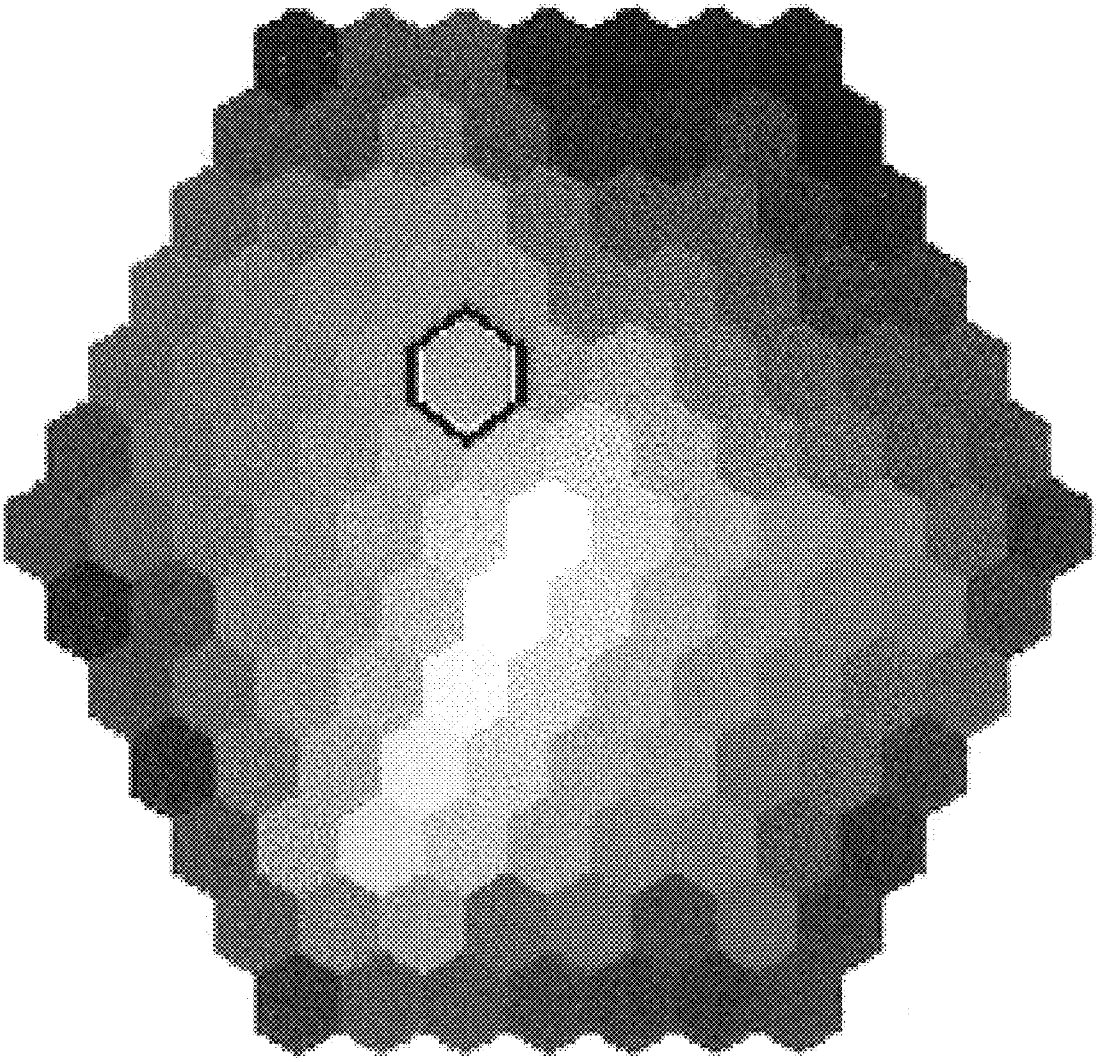
FIG. 2*a* is an example of a hexagonal honeycomb with cells filled with preferred colors.
Figure 2B:
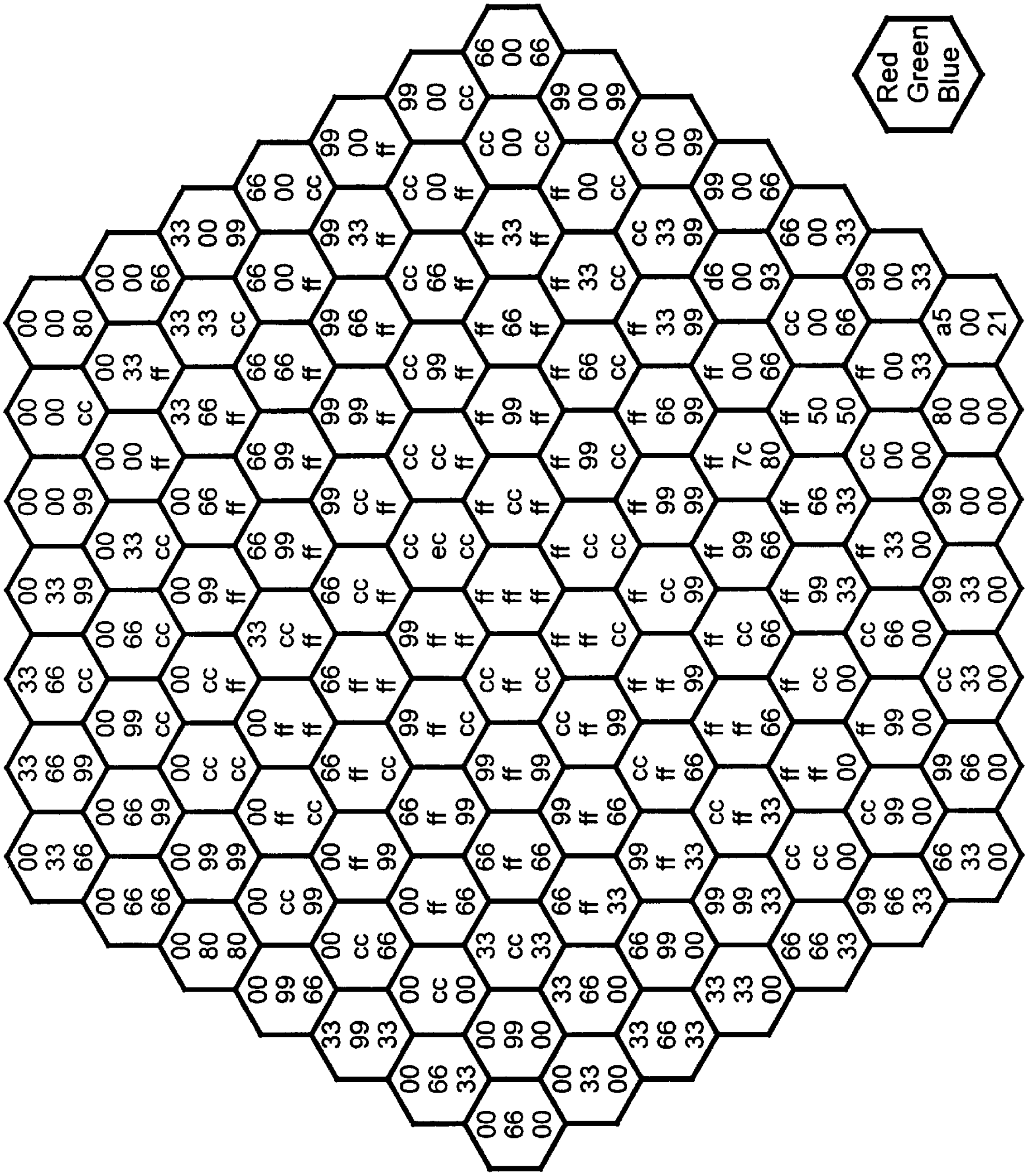
FIG. 2*b* is a hexagonal honeycomb with cells containing the preferred numerical RGB values.

FIG. 2*a* is an example of a hexagonal honeycomb with cells filled with the preferred colors. In a preferred embodiment, the color in each of the corners are a low intensity (dark) blue, violet, red, yellow, green, and blue-green, respectively. The cells along the axes of the hexagonal honeycomb are generally the same color as at the corresponding corner but with an increasing intensity (lighter) towards the center. The center cell contains the color white. Thus, the cells in a ring have a decreasing intensity as the radius of the ring increases. A ring of cells are those cells that are an equal distance from the center. For example, the cells at the perimeter of a hexagonal honeycomb form the outermost ring, and the cells that are adjacent to the center cell form the innermost ring. The radius of a ring is the number of cells from the center cell to the ring. The innermost ring has a radius of 1. The outermost ring of the hexagonal honeycomb of FIG. 2*a* has a radius of 6. The cells of a ring that are not on an axes are a mixture of the colors of the nearest cells of the ring that are on an axis. Thus, the preferred hexagonal honeycomb has the characteristic that colors of the cells get darker toward the perimeter and that the colors of cells of a ring vary around the ring from warmer to cooler. (In the HSV model, a hue of zero is the warmest [i.e., near orange-red] and a hue of one-half the maximum is the coolest [i.e., near cyan]). The preferred hexagonal honeycomb also has the characteristic that contrasting colors are cells directly opposite each other in a ring. For example, cell 101 and cell 104 are directly opposite with the contrasting colors dark yellow and dark violet, and cell 103 and cell 106 are directly opposite with the contrasting colors dark orange and dark cyan. The preferred colors of the hexagonal honeycomb also has the characteristic that the colors of adjacent cells are visually pleasing when used together as are the colors of cells whose centers are along a straight line (e.g., the axes). FIG. 2*b* is a hexagonal honeycomb with cells containing the preferred numerical RGB values in hexadecimal numbers from 0 to ff.

In an alternate embodiment, the cells at the corners are filled with the colors red, yellow, green, cyan, blue, and magenta and the center cell is filled with a color with an equal amount of red, green, and blue. In this alternate embodiment, the color of the cells also increase in darkness with increasing distance from the center cell. One skilled in the art would appreciate many visually pleasing combinations of colors can be selected to fill the colors of the hexagonal honeycomb. These colors can be selected based on the particular use for which a user will be selecting one of the colors in the hexagonal honeycomb.

Figure 3:
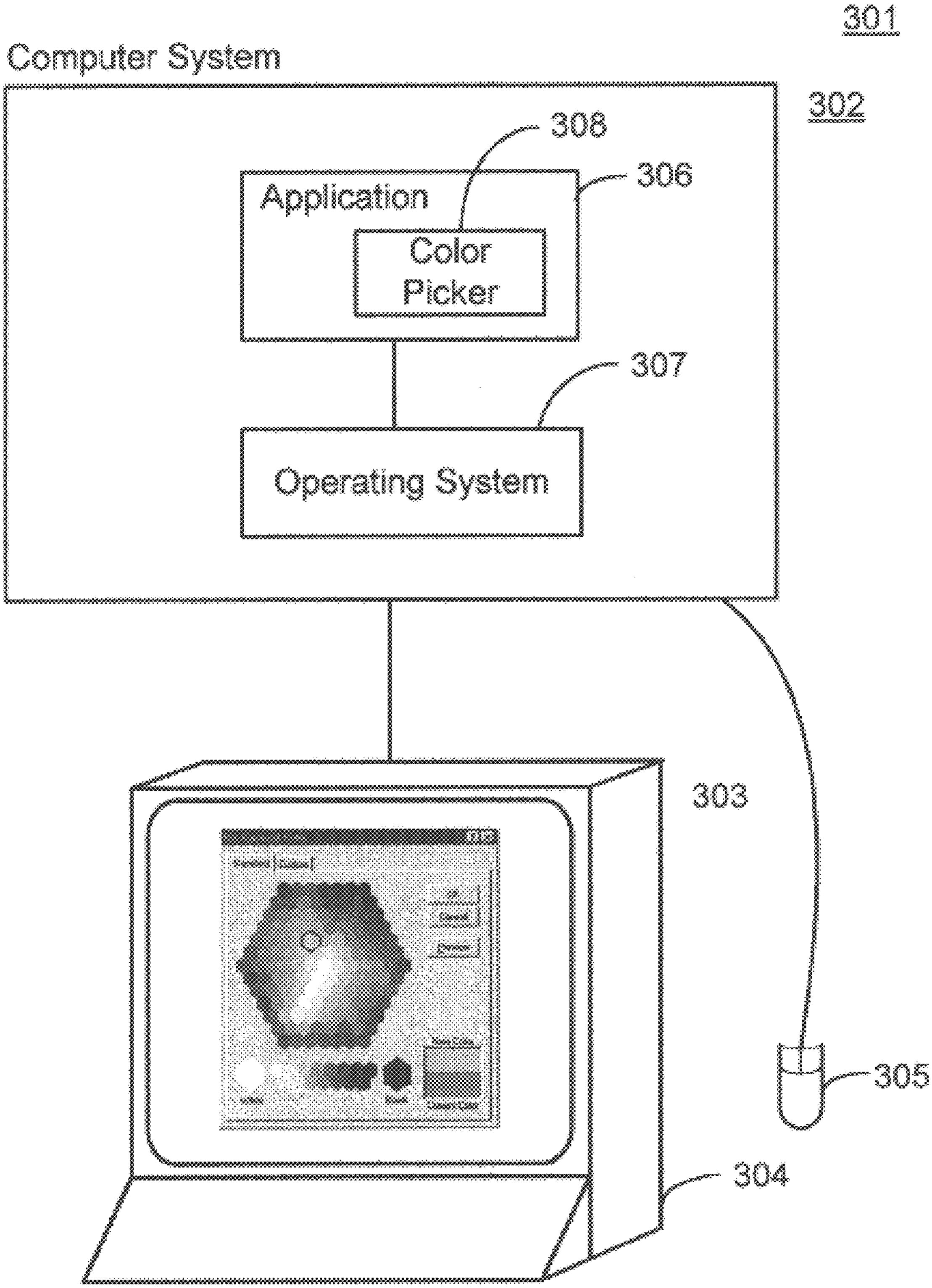
FIG. 3 is a block diagram illustrating a preferred computer system for practicing the present invention.

FIG. 3 is a block diagram illustrating a preferred computer system for practicing the present invention. The computer system 301 comprises computer memory 302, central processing unit (not shown), computer display device 303, computer keyboard 304, and mouse 305. The computer memory includes an application computer program 306 and operating system 307. The operating system acts as an interface between the computer hardware and the application program. The application program includes a color picker module 308 for controlling the selection of a color in accordance with the preferred embodiment. When the application program allows a user to select a color, the application program invokes the color picker, which implements the preferred technique for selecting a color. The color picker displays the hexagonal honeycomb on the display device. The user then uses the mouse to move the mouse pointer over the desired color and with a mouse button selects the desired color.

Figure 4:
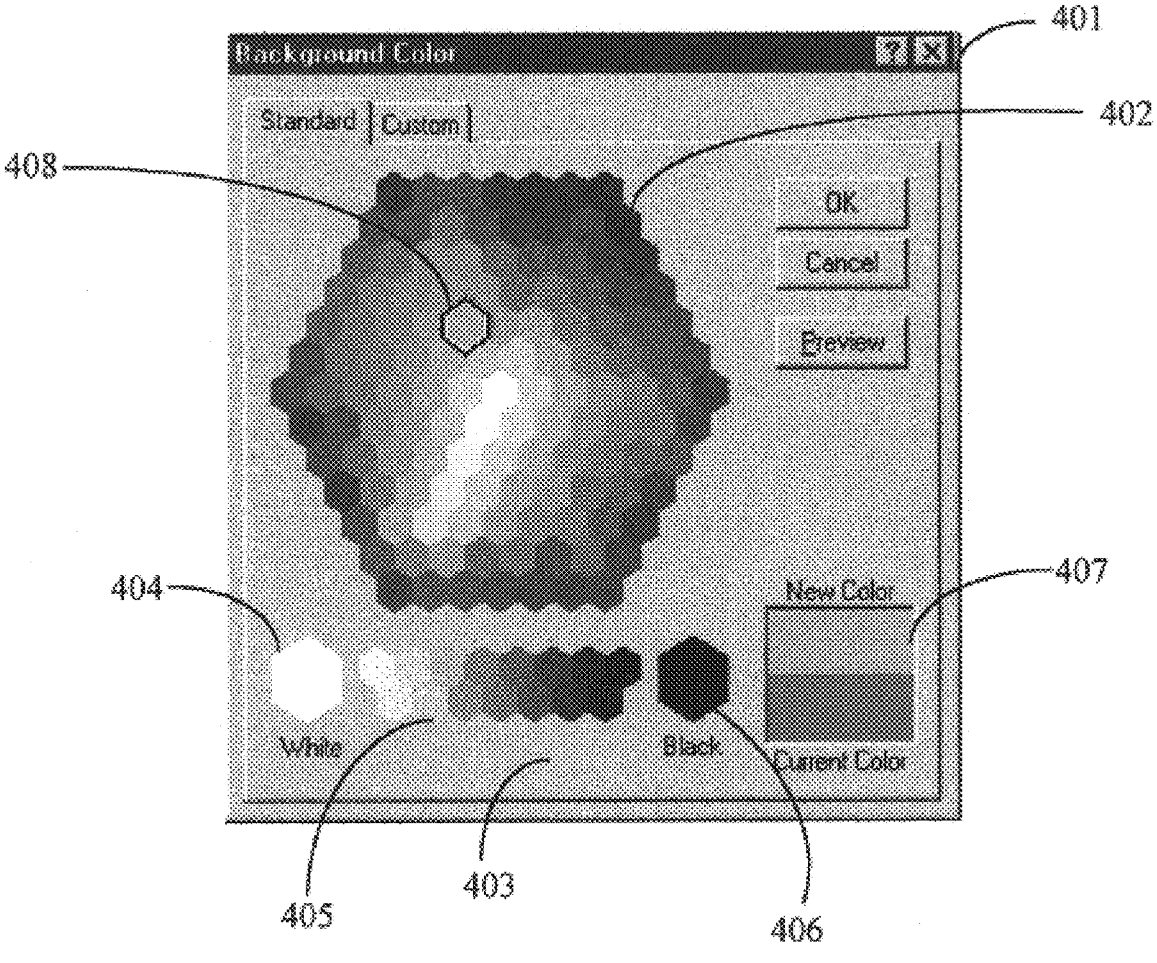
FIG. 4 is a display of a preferred color picker presentation.

FIG. 4 is a display of the preferred color picker presentation. The color picker displays within a color window 401 a hexagonal honeycomb 402, a gray scale honeycomb 403, and a new/current color block 407. As shown, the hexagonal honeycomb comprises 127 cells. Each cell contains a distinct color. The highlighted cell 408 indicates the color currently selected by a user. The gray scale honeycomb 403 contains a hexagon 404 for the color white, a series of cells 405 for various gray scales, and a hexagon 406 for the color black. The gray scale honeycomb allows a user to select various intensities of gray. Gray has the characteristic that it contains an equal amount of red, green, and blue. The color white has an RGB value of (255, 255, 255), and the color black has an RGB value of (0, 0, 0). The only cell on the hexagonal honeycomb that contains an equal amount of red, green, and blue is the center cell. Thus, the gray scale honeycomb allows a user to select a variety of gray scale values. The new/current color block has an upper portion with the newly selected color (e.g., the cell 408) and a lower portion that contains the current color for the characteristic whose color is being changed.

Figure 5:
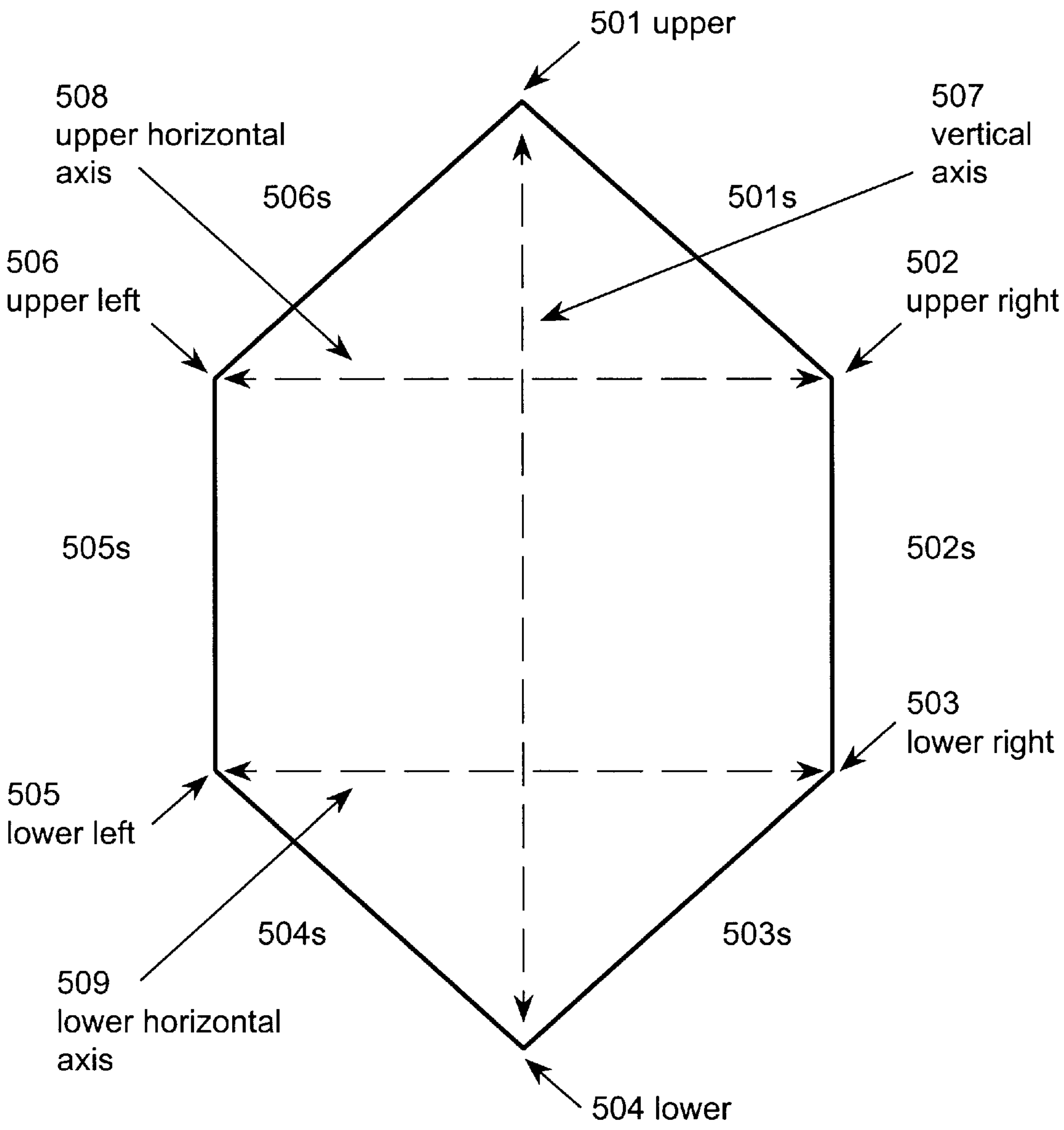
FIG. 5 is a diagram illustrating the various parts of a cell.

FIG. 5 is a diagram illustrating the various parts of a cell. The six corners 501–506 and six sides 501*s*–506*s*. The upper corner 501 is at the top of the cell and the lower corner 504 is at the bottom. Each of the other four corners are identified as the upper right corner 502, lower right corner 503, lower left corner 505, and upper left corner 506. In addition, each of the cells have a vertical axis 507 that extends from the upper corner to the lower corner, an upper horizontal axis 508 that extends from the upper left corner to the upper right corner, and a lower horizontal axis 509 that extends from the lower left corner to the lower right corner.

Figure 6:
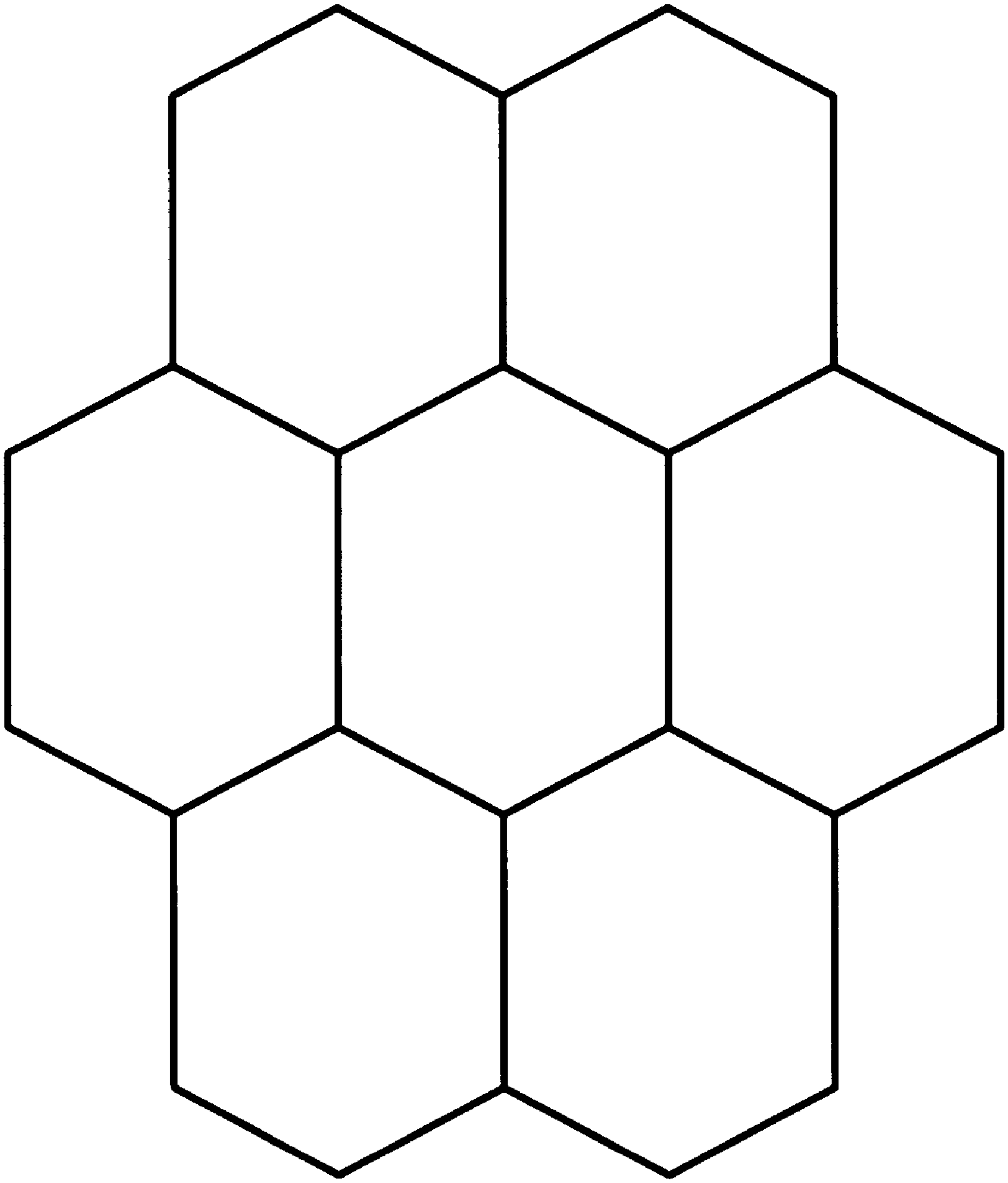
FIG. 6 is a diagram of a hexagonal honeycomb with seven cells.

FIG. 6 is a diagram of a hexagonal honeycomb with seven cells. In general, the number of cells in a hexagonal honeycomb is given by the following equation:

$$\left(6*\sum_{i=1}^{r} i\right)+1 \qquad (1)$$

where r equals the radius, that is the number of cells from the center of the honeycomb to the perimeter of the honeycomb. In FIG. 1, the radius equals 6, and in FIG. 6, the radius equals 1.

Figure 7:
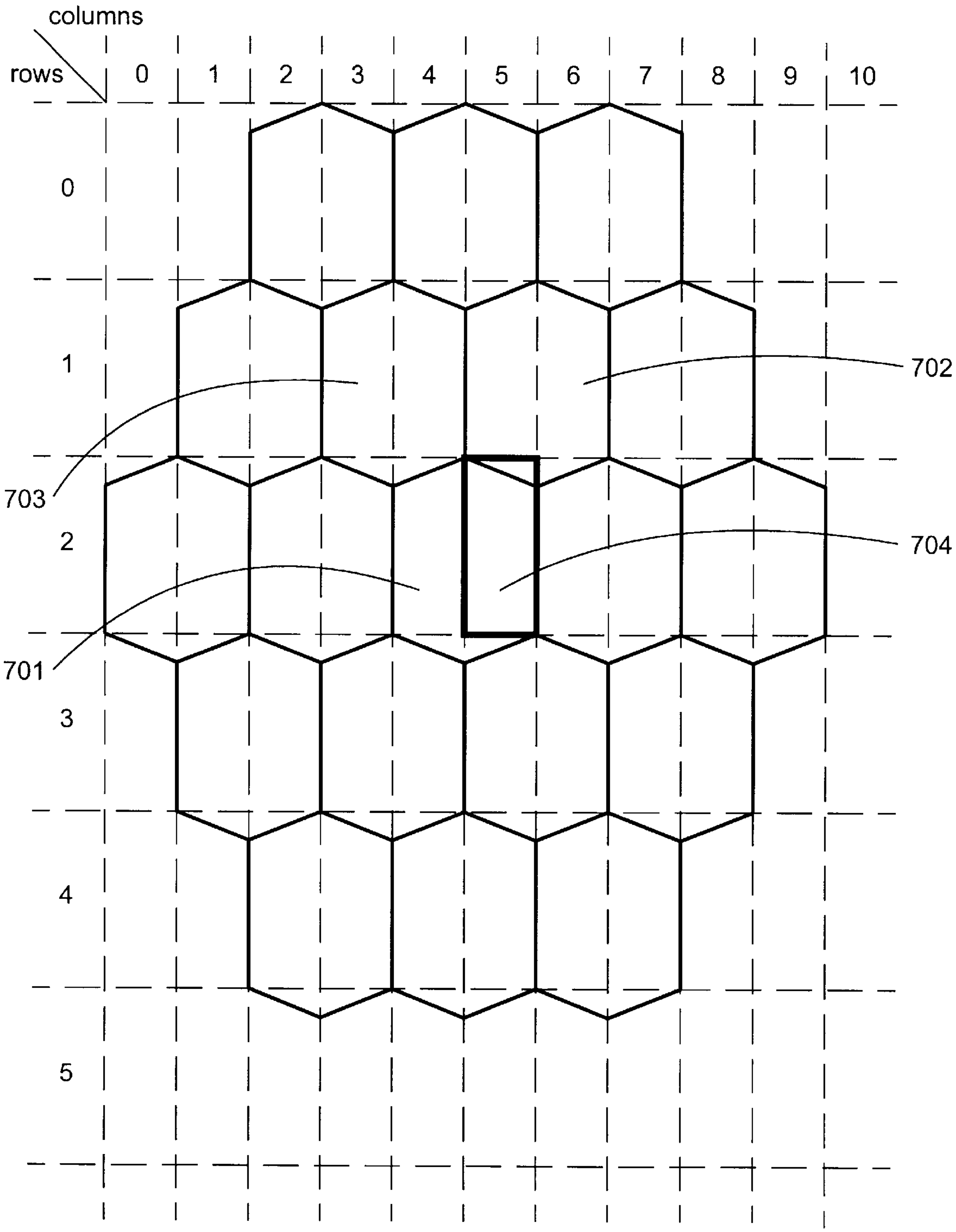
FIG. 7 is a block diagram illustrating the technique for determining a cell from X, Y coordinates of a mouse pointer.
Figure 8:
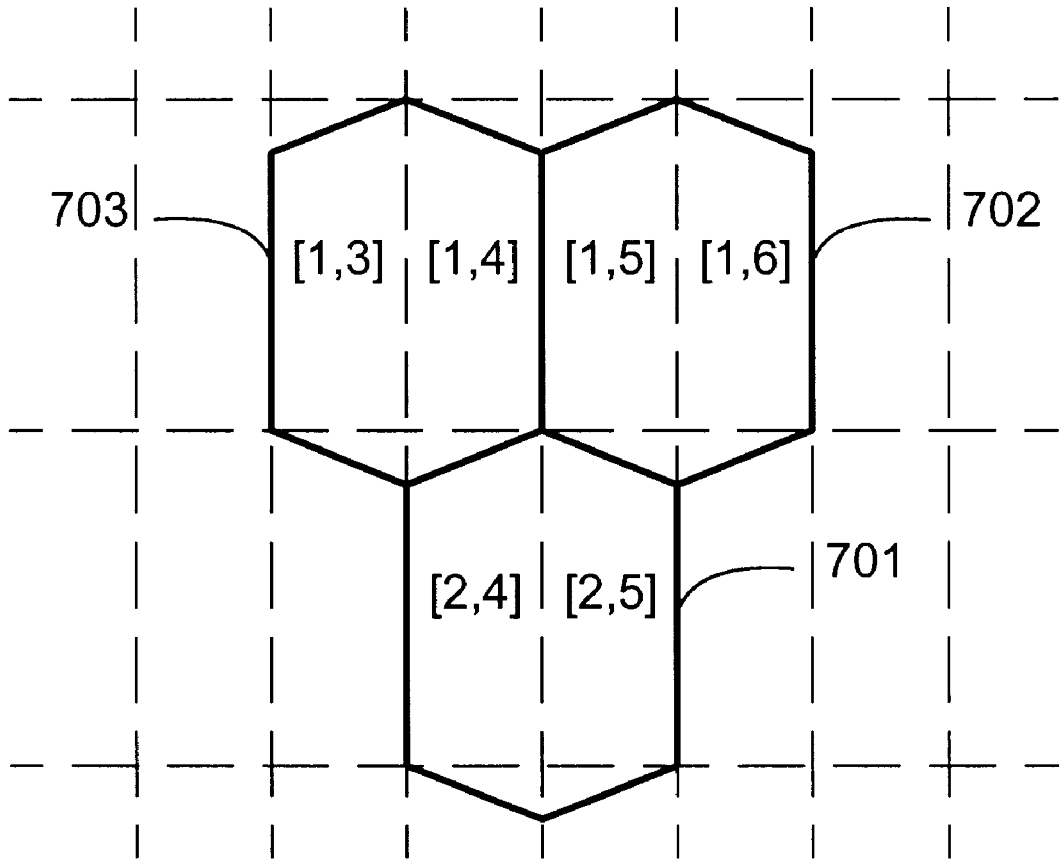
FIG. 8 shows a rectangle with adjacent cells.

In a preferred embodiment, the color picker receives the location of a mouse pointer and determines to which cell of the hexagonal honeycomb the location corresponds. The cell to which the location corresponds is the currently selected cell. FIG. 7 is a block diagram illustrating the technique for determining a cell from X, Y coordinates of a mouse pointer. For illustrative purposes, the figure shows a hexagonal honeycomb with the radius equal to 2. In a preferred embodiment, the hexagonal honeycomb is subdivided into rows and columns. Each row is defined as extending from the top of one cell to the top of the cells that are immediately lower, that is from the top of a cell to its lower horizontal axis. Each column is defined as extending from a vertical side of a cell to the vertical axis of a cell. Each intersection of a row and a column defines what is known as a rectangle. The rectangle 704 is identified as row 2 and column 5 [2,5]. FIG. 8 shows rectangle [2,5] with adjacent cells. Cell 703 is to the upper left of cell 701 and cell 702 is to the upper right of cell 701. Rectangle [2,5] contains a portion of two cells: a right upper portion of cell 701 and a left lower portion of cell 702.

In one embodiment, the color picker could identify which cell the X, Y coordinates of the mouse pointer are in by repeatedly checking if the X, Y coordinates are within the perimeter of each cell of the hexagonal honeycomb. However, in a preferred embodiment, the color picker uses the Y coordinate to determine which row the mouse pointer is in and the X coordinate to determine which column the mouse pointer is in. This row and column identify the rectangle that the mouse pointer is in, but not which cell. The mouse pointer may be in either the upper cell or the lower cell within the rectangle. Also, the cells at the perimeter of the hexagonal honeycomb may be in rectangles that are only partially within the hexagonal honeycomb. For example, in rectangle [0,2] of FIG. 7, the upper left portion of the rectangle is not within the hexagonal honeycomb. Once a rectangle is identified, the color picker determines whether the X, Y coordinates of the mouse pointer are in the upper or lower portion of the rectangle. When that determination is made, the color picker determines if the upper or lower portion is indeed within the perimeter of the hexagonal honeycomb and, if so, then selects the cell in that portion of the rectangle.

Figure 9:
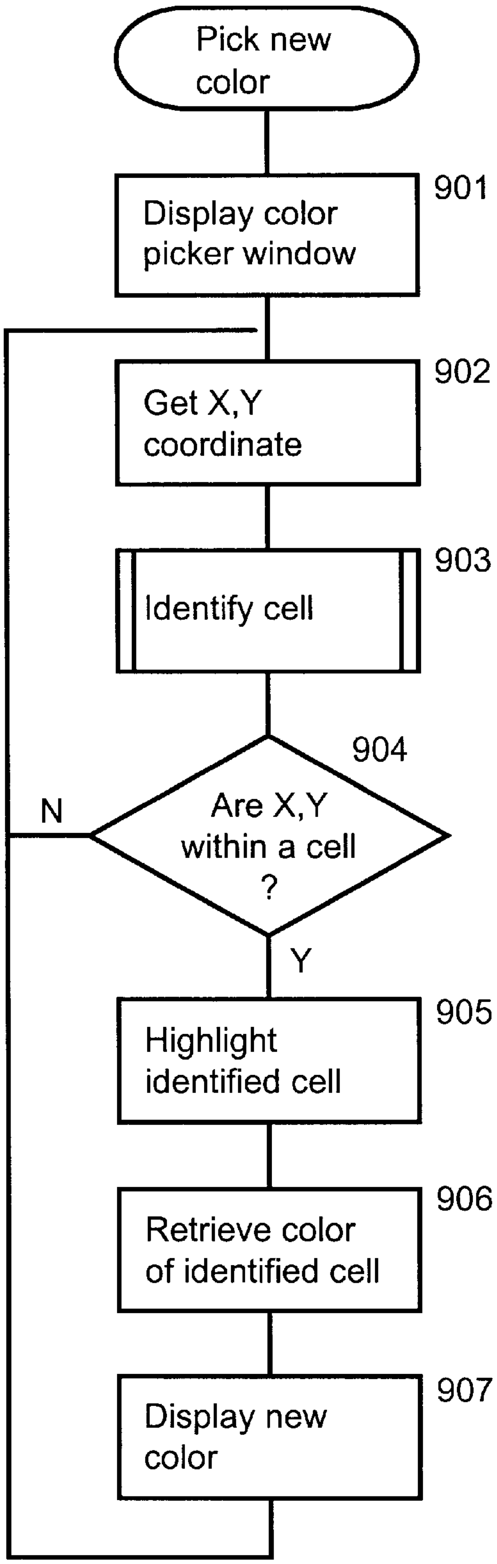
FIG. 9 is a flow diagram of a procedure to implement the color picker.

FIG. 9 is a flow diagram of a procedure to implement the color picker. The procedure displays the hexagonal honeycomb, receives the location of the mouse pointer as X, Y coordinates from a user, and if the X, Y coordinates are within a cell of the hexagonal honeycomb, then the procedure highlights that cell. In step 901, the procedure displays the color picker window. The color picker window includes the hexagonal honeycomb. In steps 902–907, the procedure loops retrieving the X, Y coordinates of the mouse pointer when the user depresses a mouse button until a user indicates to exit (not shown). The currently selected cell at the time of exit contains the selected color. In step 902, the procedure retrieves the X, Y coordinates of the mouse pointer. This retrieval is typically done in response to a user pressing a mouse button. In step 903, the procedure identifies to which cell within the hexagonal honeycomb that the X, Y coordinates correspond. In step 904, if the X, Y coordinates of the mouse pointer are not within the hexagonal honeycomb, then the procedure loops to step 902 to retrieve the next X, Y coordinates. In step 905, the procedure highlights the identified cell. In step 906, the procedure retrieves the color of the identified hexagon. In one embodiment, each cell in the hexagonal honeycomb may be assigned a unique identifier. Such a unique identifier may be assigned by the following equation:

$$\text{identifier} = \left(\sum_{i=0}^{\text{row}-1} (2r + 1 - |r - i|)\right) + \text{floor}\left(\frac{\text{column} - |r - \text{row}|}{2}\right) \quad (2)$$

where r equals the radius. For the hexagonal honeycomb of FIG. 2*b*, the RGB values for each of the colors can be stored in a table with 127 entries indexed by the identifier of the cells. In step 907, the procedure then displays the new color in the new color block 407 and loops to step 902 to receive the next X, Y coordinates.

Figure 10:
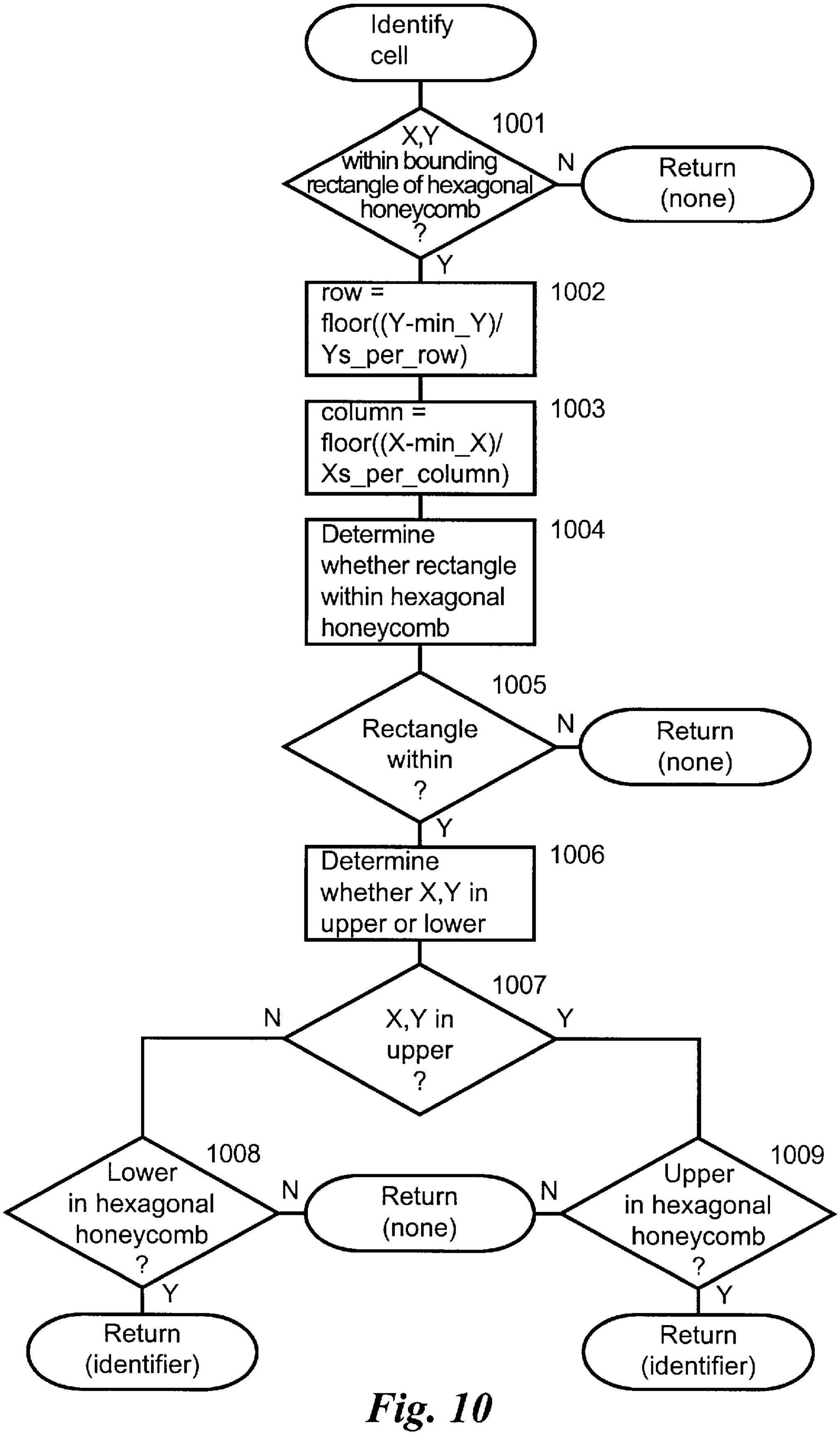
FIG. 10 is a flow diagram of the identify cell procedure.
Figure 11A:
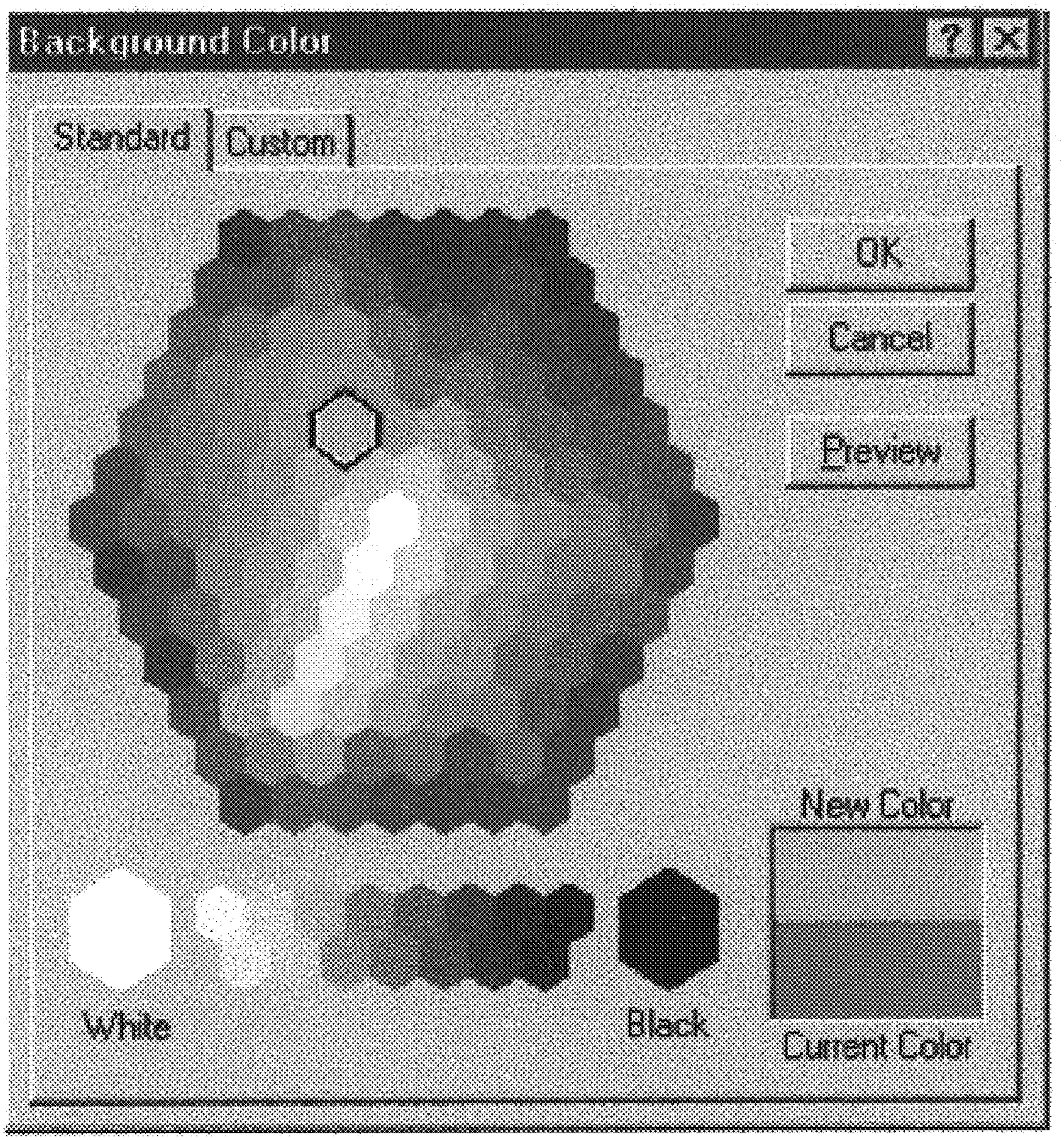
FIGS. 11*a*–11*d* are diagrams of a computer display device with an icon for a color picker.
Figure 11B:
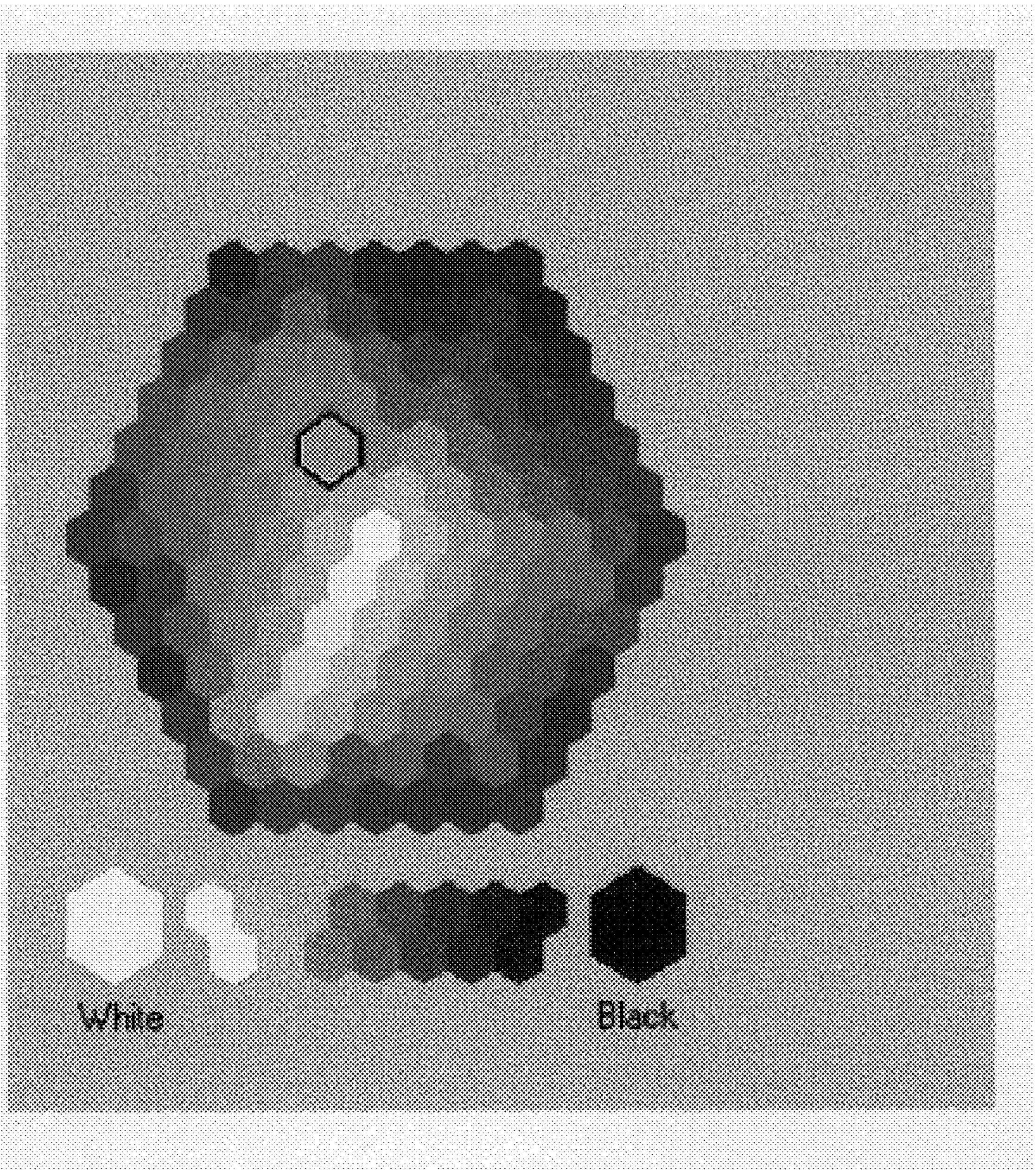
Figure 11C:
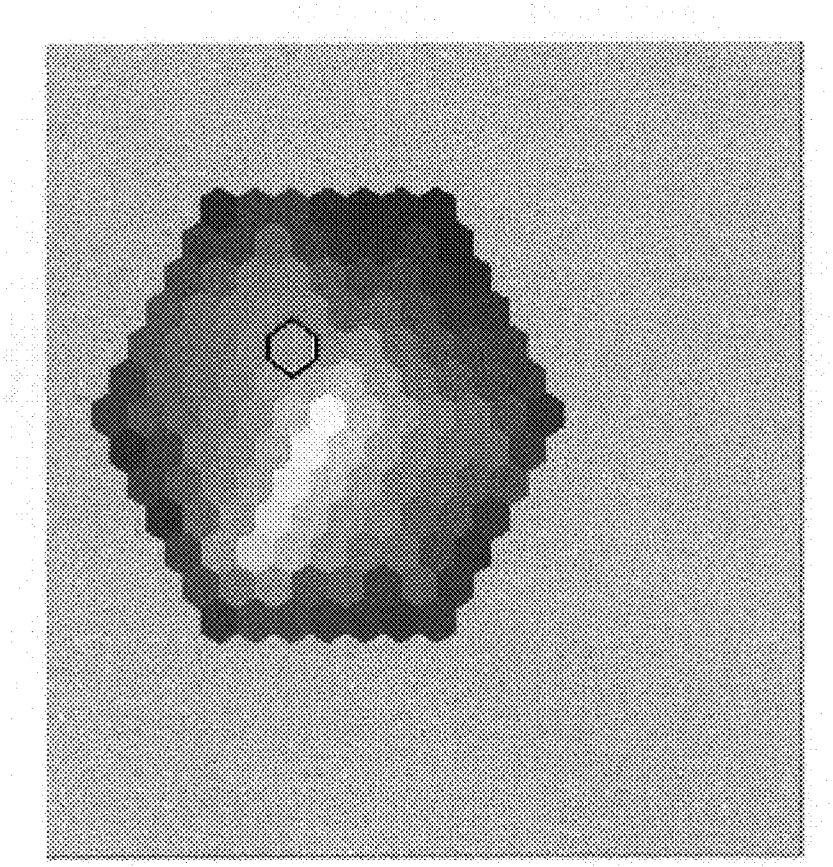
Figure 11D:
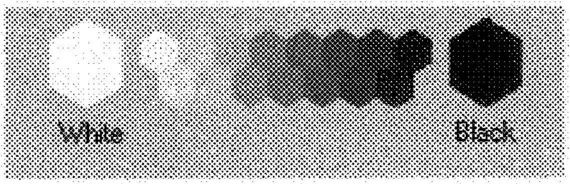

FIG. 10 is a flow diagram of the identify cell procedure. The identify cell procedure determines to which rectangle particular X, Y coordinates correspond and returns the cell identifier for the corresponding cell. In step 1001, if the passed X, Y coordinates are within a bounding rectangle that encompasses the hexagonal honeycomb, then the procedure continues at step 1002, else the procedure returns with an indication that no cell corresponds. In step 1002, the procedure determines the row to which the X, Y coordinates correspond. The row is calculated by subtracting the minimum Y value of the hexagonal honeycomb (i.e., top of the hexagonal honeycomb) from the Y coordinate, dividing that difference by the number of Y units per row, and taking the floor of the quotient. In step 1003, the procedure determines the column by subtracting the minimum X value for the hexagonal honeycomb (i.e., leftmost part of the hexagonal honeycomb) from the X coordinate, dividing that difference by the number of X units per column, and taking the floor of the quotient. In step 1004, the procedure determines whether the rectangle identified by the row and column is within the hexagonal honeycomb. The procedure determines whether no portion of the rectangle is within the hexagonal honeycomb, whether only the lower portion or the upper portion of the rectangle is within the hexagonal honeycomb, or whether both the upper and lower portions of the rectangle are within the hexagonal honeycomb. Such a determination can be made in a couple of ways. For example, an algorithm can be used or a table indexed by the row and column can have an entry that indicates which portion of the rectangle is within the hexagonal honeycomb. In step 1005, if the rectangle is within the hexagonal honeycomb, then the procedure continues at step 1006, else the procedure returns with an indication that no cell is selected. In step 1006, the procedure determines whether the X, Y coordinates are within the upper or lower portion of the rectangle. Such a determination can be made by normalizing the X, Y coordinates to coordinates relative to the particular cell and using a standard equation for the line separating the upper and lower portions. The equation for the line separating alternates between adjacent rectangles. In step 1007, if the X, Y coordinates are in the upper portion of the rectangle, then the procedure continues at step 1009, else the procedure continues at step 1008. In step 1009, if the upper portion of the rectangle is within the hexagonal honeycomb, then the procedure returns the identifier of the upper cell, else the procedure returns an indication of none. In step 1008, if the lower portion of the rectangle is within the hexagonal honeycomb, then the procedure returns the identifier of the lower cell, else the procedure returns an indication of none.

Although the methods and systems of the present invention have been disclosed and described with respect to a preferred embodiment, it is not intended that the present invention be limited to such embodiments. Rather, the present invention is intended to include all legally equivalent embodiments. For example, one skilled in the art would appreciate that hexagonal honeycombs of various sizes (i.e., various radii) can be used depending on the number of colors that are selectable. Also, shapes of honeycombs other than a hexagon may be used for displaying selectable colors. For example, a circular 110 or triangular 111 shaped honeycomb may be used. Also, many various combinations of colors can be used to fill the honeycomb depending on the use for which a user will be selecting a color. Modification within the spirit of the invention will be apparent to those skilled in the art. The scope of the present invention is defined by the claims that follow.

We claim:

1. A method in a computer system for selecting a color, the method comprising:

displaying a plurality of colors, each color is displayed in a cell of a honeycomb;

receiving a selection of one of the cells of the honeycomb; and indicating that the color displayed in the selected cell is the selected color wherein the honeycomb has an overall shape that is hexagonal and wherein the hexagonal honeycomb has a perimeter and a center cell and wherein intensities of the colors vary from high intensity at the center cell of the hexagonal honeycomb to low intensity at the cells at the perimeter of the hexagonal honeycomb.

2. The method of claim 1 wherein the hexagonal honeycomb has six axes and a center cell, wherein a color is chosen for each axis, and wherein cells along each axis are filled with various intensities of the color for that axis.

3. The method of claim 2 wherein the colors chosen for the axes are blue, violet, red, yellow, green, and blue-green.

4. The method of claim 3 wherein the cells that are not on an axis are filled with a color that is a mixture of the colors of the nearest cells that are on an axis at an equal radius.

5. The method of claim 1 wherein directly opposite cells are filled with contrasting colors.

6. The method of claim 1 wherein cells whose center point are in a straight line are filled with visually pleasing colors when used together.

7. The method of claim 1 wherein the honeycomb has six corners with a cell at each corner wherein the cells at each corner are filled each with a different color and cells other than the corner cells of the honeycomb are filled with a color that is a mixture of colors that is based on proximity of the cell to the six corners.

8. The method of claim 7 wherein cells at the corners are filled with the colors red, yellow, green, cyan, blue, and magenta.

9. The method of claim 1 wherein a cell at the center of the honeycomb contains a gray scale color and cells other than the center cell of the honeycomb are filled with a color with an intensity level that varies based on distance of the cell from the center cell.

10. The method of claim 1 wherein the colors of the cells are selected to be visually pleasing to a user.

11. The method of claim 1 wherein the honeycomb is logically divided into rows and columns forming rectangles, wherein the receiving of the selection of one of the cells includes receiving X, Y coordinates, and including determining which rectangle contains the X, Y coordinates and determining which cell within the determined rectangle contains the X, Y coordinates.

12. The method of claim 1 wherein the honeycomb contains 127 cells.

13. The method of claim 1 wherein adjacent cells are filled with visually pleasing colors when used together.

14. The method of claim 1 wherein cells whose center point are in a straight line are filled with visually pleasing colors when used together.

15. The method of claim 1 wherein indicating that the color displayed in the selected cell is the selected color includes displaying a hexagon around the selected cell.

16. A method in a computer system for selecting a color, the method comprising:

displaying a plurality of colors, each color displayed in a cell of a first honeycomb;

displaying a plurality of gray scale colors, each gray scale color displayed in a cell of a second honeycomb;

receiving a selection of one of the cells of the first or the second honeycomb; and indicating that the color displayed in the selected cell is the selected color wherein the first honeycomb has in overall shape that is hexagonal and wherein intensities of colors of the first hexagonal honeycomb vary from high intensity at a center cell to low intensity at perimeter cells.

17. The method of claim 16 includes displaying the color white in an enlarged cell at one end of the second honeycomb and displaying the color block in an enlarged cell at another end of the second honeycomb.

18. The method of claim 16 wherein the hexagonal honeycomb has six axes and a center cell, wherein a color is chosen for each axis, and wherein cells along each axis are filled with various intensities of the color for that axis.

19. The method of claim 18 wherein the colors chosen for the axes are blue, violet, red, yellow, green, and blue-green.

20. A computer-readable storage device for controlling a computer system to select a color by displaying a plurality of colors, each color displayed in a cell of a honeycomb;

receiving a selection of one of the cells of the honeycomb; and indicating that the color displayed in the selected cell is the selected color wherein the honeycomb has an overall shape that is hexagonal and wherein intensities of colors of the hexagonal honeycomb vary from high intensity at a center cell to low intensities at perimeter cells.

21. A computer system for selecting one of a plurality of colors, comprising:

a display device;

an input selection device; and a color picker for displaying a plurality of colors on the display device, each color being displayed in a hexagonal cell, the hexagonal cells being arranged in a honeycomb, for receiving from the input selection device an identification of one of the plurality of displayed cells, and for indicating that the color displayed in the identified hexagonal cell is the selected color wherein the honeycomb has an overall shape of a hexagon and wherein the intensities of the colors of the hexagonal honeycomb vary from high intensity at a center cell to low intensity at the perimeter cells.

22. The computer system of claim 21 wherein the color picker is further for displaying a plurality of gray scale colors in cells arranged in a second honeycomb.

* * * * *

UNITED STATES PATENT AND TRADEMARK OFFICE
CERTIFICATE OF CORRECTION

PATENT NO. : 5,903,255
DATED : May 11, 1999
INVENTOR(S) : Busch et al

It is certified that error appears in the above-identified patent and that said Letters Patent is hereby corrected as shown below:

Title page,
After the abstract and "Drawing Sheets" insert (3 of 22 Drawing sheets Filed in Color)

Column 1, line 4, and column 2, line 29,
Insert -- the file of this patent contains at least one drawing executed in color. Copies of this patent with color drawing (s) will be provided by the Patent and Trademark Office upon request and payment of the necessary fee --.

Signed and Sealed this

Twenty-third Day of October, 2001

*Attest:*

Nicholas P. Godici

NICHOLAS P. GODICI

*Attesting Officer*

*Acting Director of the United States Patent and Trademark Office*